July 21, 1964            V. BUSH ETAL            3,141,437
CONSTANT LIFT SYSTEM FOR CRAFT
Filed May 23, 1958            9 Sheets-Sheet 1
Re. 26059
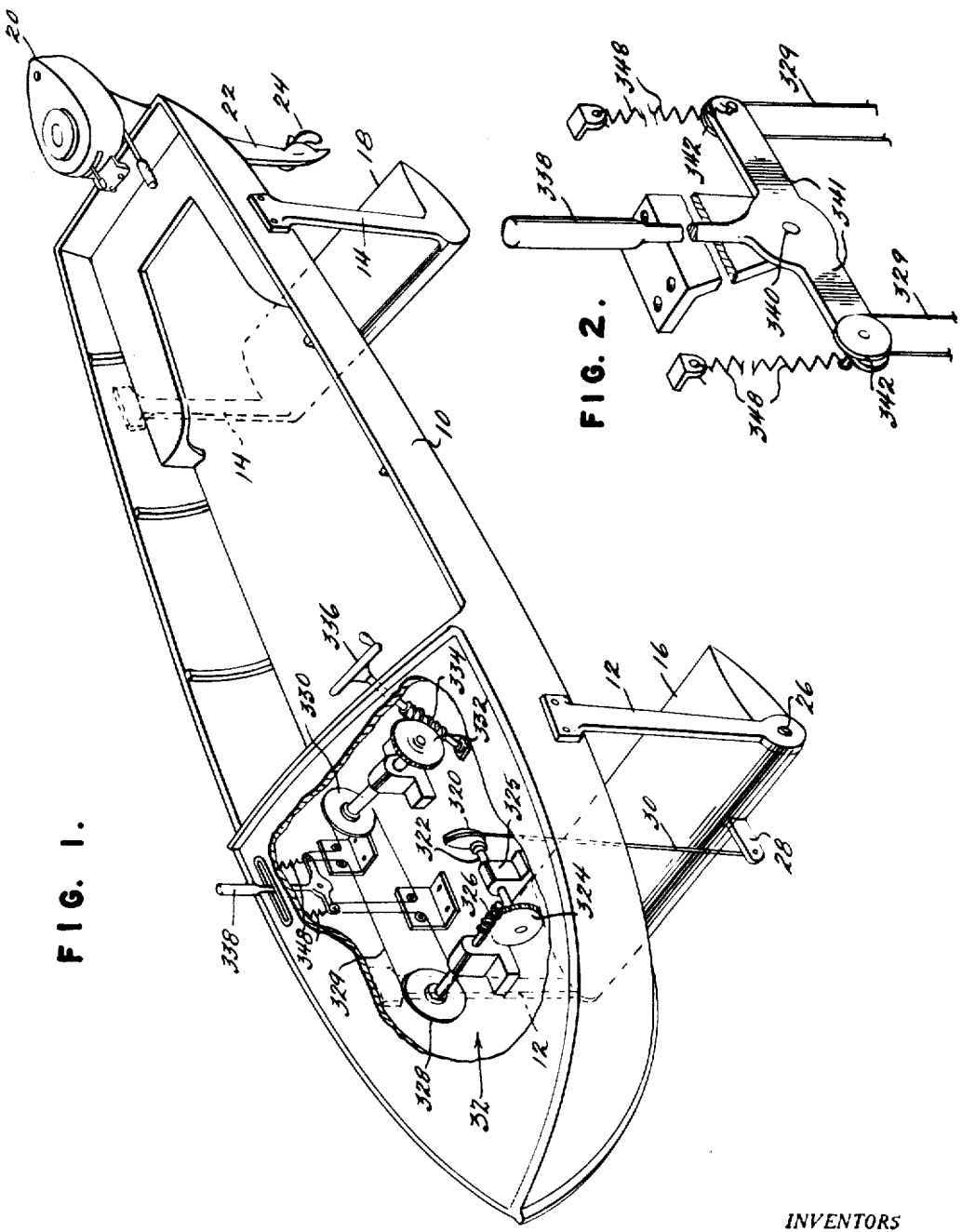
INVENTORS
RUDOLF X. MEYER
PAUL A. SCHERER
VANNEVAR BUSH
BY J. Gibson Semmes
ATTORNEYS

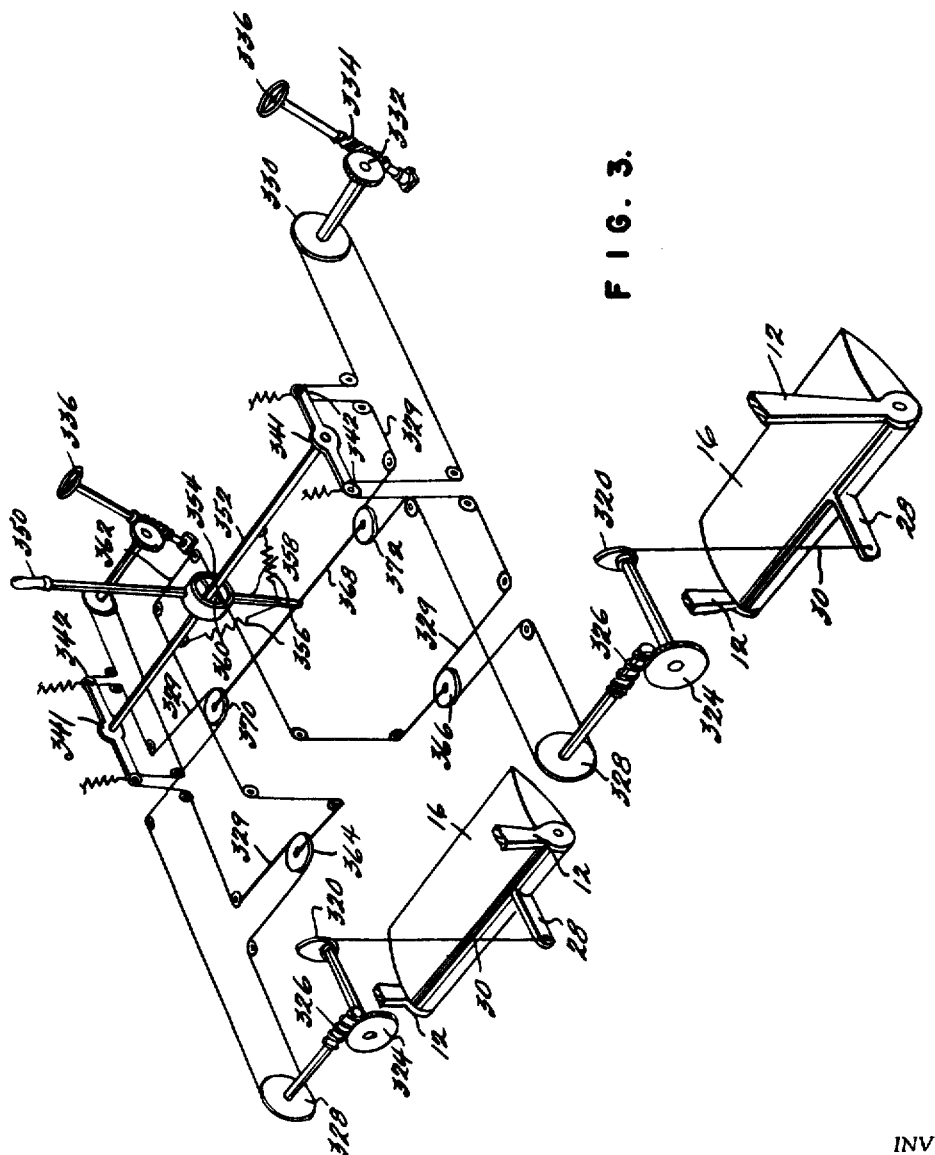

INVENTORS
RUDOLF X. MEYER
PAUL A. SCHERER
VANNEVAR BUSH
BY J. Gibson Semmes
ATTORNEYS July 21, 1964  V. BUSH ETAL  3,141,437
CONSTANT LIFT SYSTEM FOR CRAFT
Filed May 23, 1958  9 Sheets-Sheet 5

INVENTORS
RUDOLF X. MEYER
PAUL A. SCHERER
VANNEVAR BUSH
BY  J. Gibson Semmes
ATTORNEYS July 21, 1964 V. BUSH ETAL 3,141,437
CONSTANT LIFT SYSTEM FOR CRAFT
Filed May 23, 1958 9 Sheets-Sheet 6

INVENTORS
RUDOLF X. MEYER
PAUL A. SCHERER
VANNEVAR BUSH
BY J. Gibson Semmes
ATTORNEYS July 21, 1964 V. BUSH ETAL 3,141,437
CONSTANT LIFT SYSTEM FOR CRAFT
Filed May 23, 1958 9 Sheets-Sheet 8
FIG. 12.
FIG. 13.
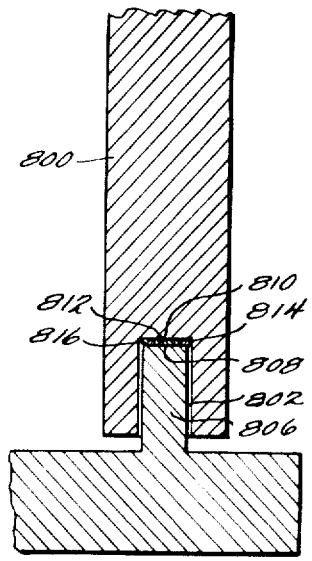
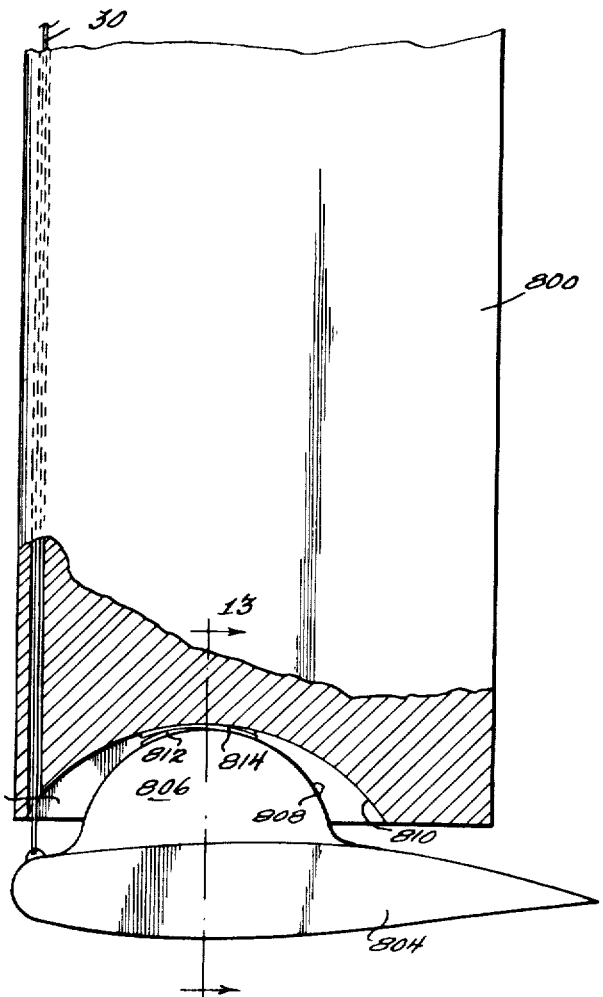
INVENTORS
RUDOLF X. MEYER
PAUL A. SCHERER
VANNEVAR BUSH
BY J. Gibson Semmes
ATTORNEYS

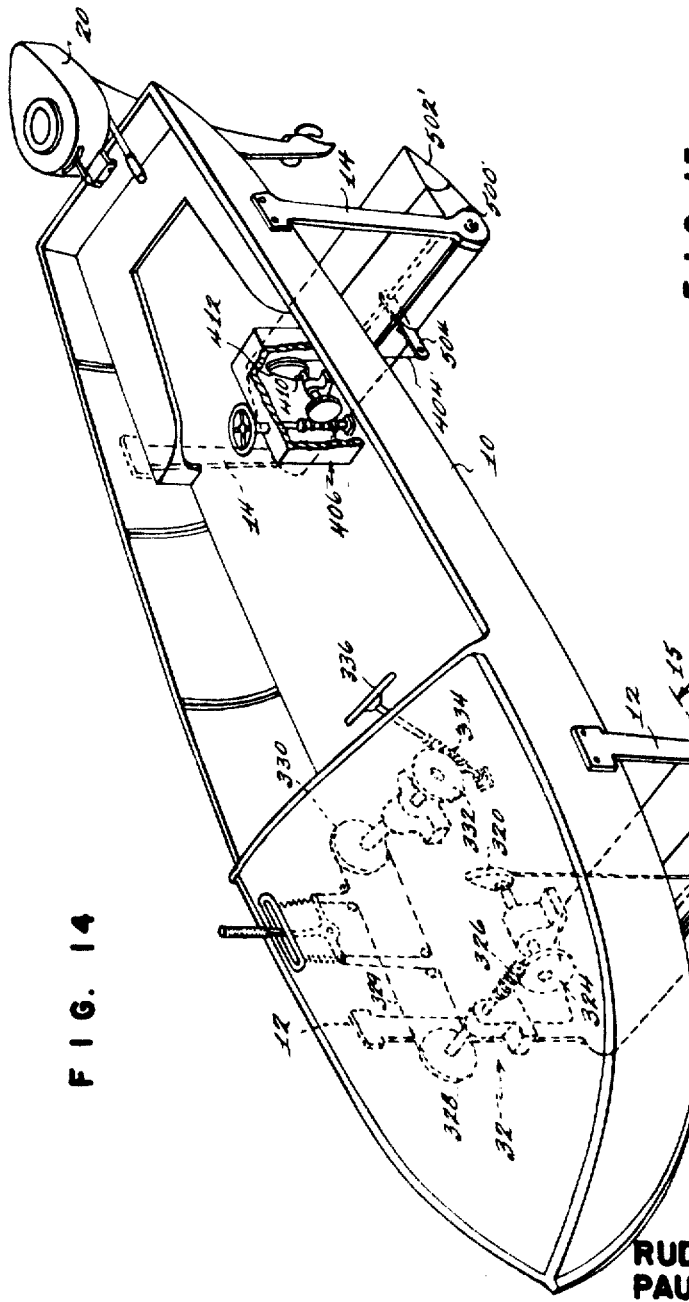

3,141,437
CONSTANT LIFT SYSTEM FOR CRAFT

Vannevar Bush, Belmont, Mass., Paul A. Scherer, Marietta, Bowie, Md., and Rudolf X. Meyer, Pacific Palisades, Calif.; said Bush and said Meyer assignors to said Scherer
Filed May 23, 1958, Ser. No. 737,355
6 Claims. (Cl. 114—66.5)

This application constitutes a continuation-in-part of prior copending application Serial No. 446,574, filed July 29, 1954, now abandoned and entitled Constant Lift System for Craft.

The invention pertains to structures of airfoil and hydrofoil section for use in supporting a load in or above a fluid, and to like structures providing a propulsive force in vessels or aircraft by reaction of a fluid. More particularly, this invention pertains to mechanisms providing and maintaining constant (or nearly constant) the "lift" or the dynamic force of a foil passing through a fluid. To comprehend the present concept, one must bear in mind that a rigid craft supporting foil would, under ideal conditions, produce a "constant lift" in quiet and undisturbed fluid such as air or water and this principle embraces the action of propellers as well as airplane wings. The invention is applicable to hydrofoils operating in a seaway or passing through a disturbed fluid and supporting or partially supporting a hull. It is likewise applicable to flaps of such foils as will be more fully explained hereinafter. The principle of the invention is also applicable to other types of foils such as ship and aircraft propellers, helicopter blades and airplane wings.

It is to be understood that the term hydrofoil craft as used hereinafter is intended to include, by way of example only, wholly or partially hydrofoil-supported displacement craft, and flying boats, seaplanes, and aircraft with conventional fuselages having hydrofoils mounted thereon. Such hydrofoils may be retractably or non-retractably mounted in each case with consequent advantages.

The term "flotation element" as used hereinafter, and in the claims, includes hulls, floats and other constructions adapted to be water sustained.

The term "constant lift" is construed to mean force-balanced, as where the lift coefficient of the foil is made stable, irrespective of its angle of incidence, speed in fluid, attitude of craft, or disturbing forces through which the foil may pass. In the basic concept of invention, the lift of a foil is made stable by providing a working force which operates about the spanwise fulcrum of a foil in opposition to the "lift" of the foil passing through fluid. This principle of constant lift is therefore not only independent of craft velocity but also of orbital motion of the fluid through which the foil passes and attitude of the foil-supported craft.

"Gradient," positive or negative refers to variation from constant lift as in overbalancing a foil or foil shaped flap, to create a "ratchet effect" as where one desires to increase (positive) or decrease (negative) the effective angle of attack of the foil dependent upon the nature of the seaway through which the foil is passed and/or the position of maximum load in foil-supported craft.

The hydrofoil principle per se is well known in the art and is ordinarily utilized in connection with a more or less conventional hull structure operating as a displacement vessel, otherwise when in the hydrofoil operating condition and during transition thereto and therefrom, such hulls bear one or more vertical struts beneath, the struts carrying one or more water foils. These foils are so designed that when the vessel has attained a predetermined speed, the lift or dynamic supporting force which they impart to the hull structure is sufficient to raise the hull or a portion thereof above the water surface, with these and other advantages: consequent reduction in resistance to the craft's motion, increased maneuverability, and increased stability, especially in a seaway.

Previous attempts to develop high speed hydrofoil craft have given rise to difficulty in effecting control in a seaway and in currents. As is well known, water particles in a seaway composed of wind-generated waves, move in orbits which are greatest at the surface of the water, and extend downwardly with attenuation, which is a function of the ratio between depth and wave length. Such motion is significant at depths at which hydrofoils normally operate. For example, assume waves five feet high having a length of 50 feet, then the orbital motion three feet below the trough will be approximately ½ the amplitude of the motion at the surface. Where wind generated waves meet a current of opposite direction, orbital motion occurs similar to that of waves in currentless water; however, the distances from crest to crest are shorter and the wave form is consequently steeper and sharper. Waves also occur moving angularly with respect to other waves and this interference creates a "confused sea" in which water particles are subjected to relatively violent motion in irregular orbits and with irregular velocity. In addition to wind generated waves there are many other types of disturbed fluid flow which tend to deflect hydrofoils from horizontal motion.

The problem will be understood if it is assumed that a hydrofoil is traveling in a horizontal direction in a wind-generated seaway, thus, as that foil travels it will be subjected to variations in flow. If the foil is rigidly attached to the craft, this will have the effect of increasing or decreasing the effective angle of attack of the foil and therefore the lifting force produced by that foil. The relative velocity between fluid and foil will also vary, resulting in a change in the lifting force of the foil.

A principal object of this invention is therefore to provide a working mechanism causing a foil to adjust to such variations in flow so that the lift produced by the foil will remain substantially constant. This objective is accomplished according to the present invention by providing a controllable force (hereinafter called the "generated force") or moment acting in opposition to the lift of the foil and which force or moment in normal flight balances such lift. Any variation in the effective angle of incidence varies the lift of a foil and therefore tends to unbalance a rigid system. This "unbalance" acts through mechanisms, hereinafter described, and the balancing principle acts upon a moveable system to maintain . . . substantially the same value of lift. This may be effected by such means as rotating the foil or a portion thereof, deflecting a flap or flaps mounted on said foil, or by other means. Thus, it will be appreciated that whereas the system is defined in terms of foils per se, this includes equivalents such as deformable portions of foils, flaps or deformable portions of the same.

Another object of this invention is to provide mechanisms in which the generated force is not exactly constant. Mechanisms with positive force gradients and those with negative force gradients have utility separately and in combinations.

Manual or automatic means may readily be provided to vary the value of lift per se produced by the foils. Such overriding means are effective in correcting departures from the desired elevation of flight due to inertia in the system or other causes. However, such corrections need not be large since substantially all of the disturbing forces are compensated for automatically in a constant lift mechanism.

A constant lift mechanism is equally useful in compensating for disturbances or irregularities of other types in water and in air. Ships' propellers, as an example, normally operate in a disturbed flow of water caused by the hull shape and the position of supporting struts and shafts. They may also be subjected to different loads due to the change in depth of the blades as they rotate. A constant lift mechanism can be incorporated in propellers and will perform a function similar to that described above.

Incorporation of a constant lift mechanism in helicopter blades as an objective is particularly valuable. As is well known, the velocity of each blade of a helicopter when in horizontal flight varies with respect to the air through which it passes, depending upon its direction of motion relative to the direction of motion of the helicopter. As the blade moves forward in the direction of travel of the helicopter, the maximum velocity of the blade through the air at a given radius from the center of rotation is equal to the speed of rotation at that radius plus the speed of the helicopter. Conversely, as it moves in the opposite direction, its minimum velocity at a given radius is the velocity of rotation at that radius minus the speed of the helicopter. Similarly, the effective angle of air flow relative to each blade at a given radius will vary with the change in direction of motion of that blade due to the inclination of the plane of rotation while the helicopter is moving horizontally. If the angle of the blade remained constant as the blade rotated, this increase in velocity and angle of attack would produce a substantial increase in lift on one side of the craft and would tend to produce an overturning moment. By incorporating the constant lift principle in helicopter blades, each of the blades will automatically adjust its angle of attack to provide the desired amount of lift at all points in its orbit.

The constant lift system as applied to hydrofoil craft, however, in addition to compensating for changes in direction and velocity of water flow, has an inherent tendency to prevent hydrofoils from emerging above a minimum depth of submergence. In actual practice, it may be noted, the pivot line of hydrofoil craft has been successfully established at 5% of chord and less, forward of the foil center of lift. As a hydrofoil approaches the surface, the center of lift tends to shift toward the trailing edge. This shift is approximately 5% of chord at a submergence of one chord. As the foil rises above that point, the shift becomes progressively greater. Although the total lift of the foil decreases simultaneously, it does so at a lower rate. With a constant lift mechanism, the moment of the force generated in opposition to the lift remains equal to that of the lift up to a predetermined altitude. If the foil should rise above that altitude, the moment arm of the lift would increase and overbalance the generated force. The craft would then descend until the foil again assumed an angle of attack adequate to support the original lifting force. At this time the value of vertical acceleration has again reached zero but the downward velocity will continue at constant value until corrective "generating forces" are applied. To further explain, if the craft is crusing at a foil submergence of somewhere about one chord and if it is displaced upward and downward by some extraneous disturbing force, then the craft, with no change in the energizing force, will tend to return to its original condition, since below this level the moment created by the lift of the foil and the distance from the axis of its rotation will balance the energizing moment only when the angle of attack of the foil has increased. At this instant the lift is now greater than at a submergence of one chord and the craft will rise. If the initial displacement is upwards, the lift line will work aft and the balancing moment will be developed with a lower angle of attack and the craft will thereupon ride nearer the water surface.

It is a further object of the invention to provide in combination with a constant lift mechanism, a positive control system comprising means for sensing the vertical position of the craft or foil with respect to the surface of the water, and means for modulating the constant lift forces independently of or in accordance with depth information and in cooperation with the surface effects above described.

Still another object of the invention is to provide a hydrofoil craft incorporating a mechanism of the type just described with additional means whereby manual or other control influences may be utilized to override the automatic constant lift control, as, for example, for maneuvering or during transition between operation of the craft as a hydrofoil craft and as a surface vessel, or for other purposes.

The above and other objects and advantages of the invention will best be understood from the following detailed description of certain preferred embodiments thereof, given by way of illustration and example, and illustrated in the accompanying drawings in which:

FIG. 1 is a diagrammatic perspective view, partly broken away, of hydrofoil craft, illustrating a mechanism suitable for the attainment of constant lift on one foil, with manual override control.

FIG. 2 is an enlarged view of a portion of FIG. 1.

FIG. 3 is a fragmentary perspective view of a hydrofoil craft illustrating mechanism suitable for the attainment of constant lift with manual override control which includes manual control of roll.

FIG. 12 is a fragmentary enlarged side elevation, partly in section, showing a travelling or rolling pivot for a hydrofoil mounting on a strut.

FIG. 13 is a sectional view taken on line 13—13 of FIG. 12.

FIG. 14 is a perspective view of craft employing the system as adapted to the flap of a coil.

FIG. 15 is a horizontal sectional view of a portion of the craft shown in FIG. 14, taken along the lines 15—15 thereof.

In the various figures of the drawings, like reference characters are applied to similar parts throughout.

Figure 4:
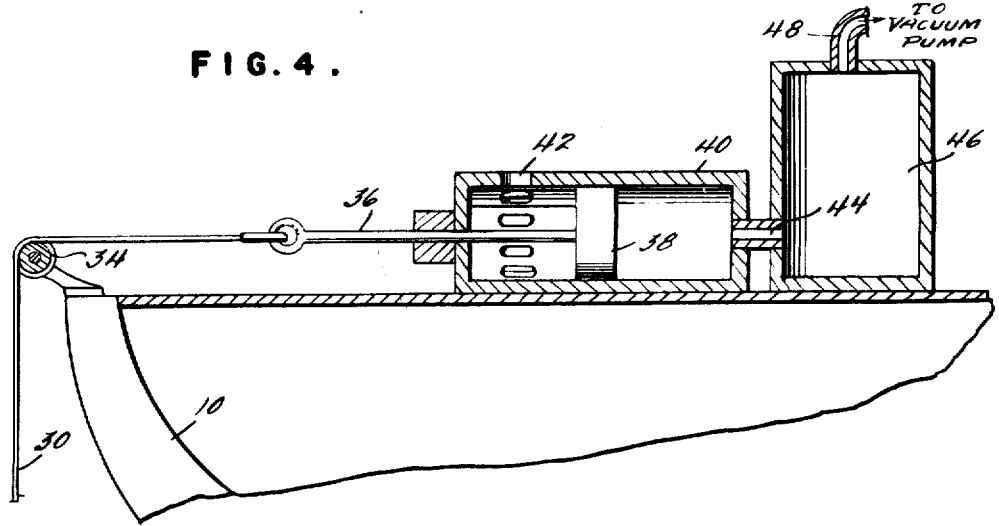
FIG. 4 is a vertical sectional fragmentary view of an arrangement capable of providing the generated force required for satisfying the constant lift condition for varying speeds of flight.

Referring now to FIG. 1 of the drawings, there is illustrated a hydrofoil craft, generally of conventional arrangement in that it includes a hull structure 10 supported by forward struts 12 and rearward struts 14 each having at its lower extremity a hydrofoil such as those indicated at 16 and 18. Means for propelling the craft are represented by engine 20, transmission system 22 and a propeller or water screw 24. These parts are well known as such, and it is to be understood that the form and arrangement shown are not essential to the present invention; thus, different propulsion systems and more or fewer struts and hydrofoils may be employed with suitable means to provide lateral stability. For purposes of illustration, a forward hydrofoil 16 is shown as pivoted at 26 to the forward struts 12 and a lever arm 28 which is rigid with the foil extends forwardly for controlling the angle of attack of the foil 16, the fulcrum being located on the pivot axis 26. A cable 30 is shown as attached to the forward end of lever 28 and extending upward into the hull of the vessel. Cable 30 is fastened at the upper end to a spring or torsion bar mechanism generally designated 32 or similar force generating apparatus.

The cable tension mechanism 32 as illustrated in FIG. 1 is a mechanical system which can be designed to provide desired variations of cable 30 tension with cable 30 displacement or can be designed such that cable 30 tension is constant and independent of cable 30 displacement. The mechanism 32, as shown in the drawings, consists of cable 30 terminating and wrapping on a cam 320 which is fastened to a torsion bar 322. The cam 320 is so shaped that after the torsion bar 322 is twisted to exert the desired force the effective radius of cam 320 with respect to torsion bar 322 varies so as to compensate for the gradient resulting from the winding or unwinding of torsion bar 322 thus keeping the tension of cable 30 constant. (The torsion bar 322 can be replaced by a common extension spring each end of which is fastened to a separate cable and each of which wraps on a separate drum, one drum having cam 320 attached to it, the other drum having gear 324 attached to it.) The opposite end of torsion bar 322 is attached to a gear 324 which acts with a worm 326 to wind up the torsion bar 322 for trimming and control. The torsion bar 322 is rotatably supported by one or more bearings 325. The worm 326 is rigidly attached to a pulley 328 which is connected by cable 329 to pulley 330. Pulley 330 is rigidly attached to worm wheel 332 which meshes with worm 334 which is connected to trimming hand wheel 336. Adjustment of the trim wheel 336 acts to control the amount of lift provided by foil 16.

In order to obtain manual override control, a control stick 338 is attached to the cable 329 system such that its movement will be additive to that of the trim wheel 336. As better shown in FIG. 2, the stick 338 and arms 341 are rigidly fastened together and pivoted at 340. At the extremities of arms 341 pulleys 342 are rotatably mounted and are tied into cable 329 system so that when the stick 338 is moved, one side of cable 329 is pulled and the other side of cable 329 is slackened. Since pulley 330 is locked by worm 334, only pulley 328 will rotate, thus increasing or decreasing the twist of torsion bar 322 and altering the angle of attack and lift of foil 16. Worm gearing 326 and 324 blocks the torque of torsion bar 322 from passing back through the system to the control stick 338 or to the trim wheel 336. Springs 348 may be attached to the extremities of arms 341.

When the moment of the lift on the foil 16 about the foil pivot is equal in magnitude and opposite in direction to the moment produced by the tension in cable 30 about the same pivot, the foil is in equilibrium. If a decrease in the lift of foil 16 occurs, for example, as a result of the entry of the foil into a region of downward moving water particles, an unbalance occurs. Since the tension on cable 30 remains constant, lever 28 will move in a clockwise direction thus increasing the angle of foil 16 relative to the horizontal but restoring substantially the same angle of attack relative to the water flow and therefore the same lift. If the lift on foil 16 increases then the reverse motion will occur. Since the tension of cable 30 remains the same regardless of travel, any amount of rotation of the foil within design limits is possible to meet variations in the direction of water particles.

With respect to symmetrical foils and certain types of cambered foils, the center of lift remains approximately in the same position regardless of angle of attack. An increase of the velocity of flow relative to the foil will produce increased lift. This increase will therefore overbalance the generated moment and rotate the foil to decrease its angle of attack to restore the lift to the desired value. The constant lift mechanism described above with respect to such foils therefore adjusts the angle of attack to provide a constant lift for a given weight of craft at a given height regardless of orbital motion of the water particles and regardless of changes in velocity. Under the above conditions and if there is sufficient hydrofoil velocity, any desired lift can be obtained by adjusting the tension of cable 30. Inasmuch as cable 30 terminates in the hull, this can be readily accomplished. The craft can be trimmed for any desired load to be carried by that foil. During the transition from surface or displacement operation to hydrofoil operation, until flight speed is attained, this arrangement will enable foil 16 to be kept in a desired feathered condition.

However, with a cambered foil of the type in which the center of lift shifts with a change in angle of attack, a properly shaped cam at 320 of FIGURES 1 and 3 will provide a gradient for the generated force sufficient substantially to compensate for changes in angle of attack due to orbital motion at a predetermined speed.

FIG. 3 of the drawings illustrates a means for providing correlated control in differential fashion, for a pair of foils for manual roll or bank control of a craft. In this figure, to permit a scale providing adequate clarity, only the significant control portions are shown, and it is to be understood that the propulsion means and rear foil arrangement, not shown, may be as in FIG. 1. Also, since a major portion of each forward foil control is identical with that of FIG. 1, the same reference numerals have been applied to corresponding parts. In FIG. 3, the front foils 16 are two in number, each mounted and controlled generally in accordance with FIG. 1. However, a single stick or control lever 350 is provided, such that movement thereof forward or backward simultaneously adjusts the moments applied to the foils 16 in the same sense, while movement of the same lever to one side or the other serves to adjust the moments applied to the foils 16 in a differential sense. To this end, and as shown in the drawings, the arms 341, carrying the two sets of pulleys 342, are secured to a cross shaft 352 connected at its midpoint to a ring 354, from which extends the stick 350. Ring 354 is shown as held normally in upright position, as respects sidewide movements, by springs 356 connected from points on shaft 352 to a downwardly extending arm 358 secured to ring 354. When stick 350 is moved left or right, ring 354 may pivot on a pin bearing 360 which also connects the ring to shaft 352.

At a point on stick 350 above ring 354, there is connected thereto a cable 362 which extends over guide pulleys to the axles of override pulleys 364, 366, around which pass cables 329 of the respective controls of the two foils 16. At pulleys 364 and 366, it is the lower pass of cables 329 which are effected by movements of pulleys 364 and 366, and it is clear that the effects will be differential. Another cable 368 is connected to a point on arm 358 of ring 354, leading over suitable guide pulleys (not shown) to the axles of override pulleys 370, 372 about which pass the upper reaches of the individual foil control cables 329. Appropriate location of guide pulleys in close proximity to shaft 352 permits fore and aft movement of stick 350 to take place without materially affecting the tension in cables 362 and 368. Pulleys 342 herein permit adjusting action in a manner exactly similar to the effect of the pulleys 342 of FIGS. 1 and 2.

Individual trim of foils 16 can still be adjusted by the control wheels 336, as in the case of FIG. 1. However, short period manual override is provided for both foils, in equal amounts, by fore and aft movement of lever or stick 350, while differential adjustments of the foils, for roll control, are readily effected by lateral movements of the stick.

FIG. 4 of the drawings illustrates another feasible arrangement for obtaining a constant force upon a cable 30. In this view, the hull is again represented by numeral 10, and the cable 30 is shown as extending about a pulley 34 and terminating in a rod 36 connected to a piston 38 operating in a cylinder 40 provided with ports 42 opening to the atmosphere on the forward side of the piston. A duct 44 communicates, via a reservoir 46, with a conduit 48 connected to a vacuum pump or other source of reduced pressure. Considering first the case in which the space to the right of piston 38 is a perfect vacuum, and in which the space to the left of the piston is open to the atmosphere, it is clear that movement of the piston in or out will not alter the pressure differential across the piston. This constant pressure differential keeps the cable 30 under constant tension regardless of piston displacement or movement of the cable, within the design limits. In the case of a near vacuum, the resulting change in pressure on the righthand side of piston 38 can readily be reduced to any desired value by the use of the reservoir 46 of adequate volume; e.g., several times the volume of cylinder 40 lying to the right of piston 38 in its maximum leftward position. In this way, the change in pressure attendant upon movements of piston 38 can be reduced below any desired value. Such a system is also valuable to use in conjunction with other force generating means to provide e.g. 80% of the force required, thus reducing to e.g. 20% the control force acting through said other force generating means.

The basic system previously described has been reduced to satisfactory practice, the conditions of operation having included foil disposition of a means submergence of approximately one chord.

The arrangements so far described, while capable of holding the vertical acceleration at substantially zero value, and as a special case, maintaing the craft in operation, parallel to a reference horizontal plane, do not always, in themselves insure the establishment of a fixed relationship between the craft and the water surface. To accomplish this further aim, it may be desirable to add to the system additional mechanism for sensing the depth of submergence of the hydrofoils (the support struts being of fixed length), and such sensing means may comprise, for example, an auxiliary pilot foil designed to operate at or near the water surface, or equivalent devices such as a device which measures the depth in the vertical struts into which water enters through two holes located in the after portion of the strut foil at the same height and at a location where the velocity ratio is unity or approximately so. While the main function of the surface-sensing element is to permit controlling the generated force on the main foil in accordance with depth of submergence, it also functions as an antibroaching device.

Figure 5:
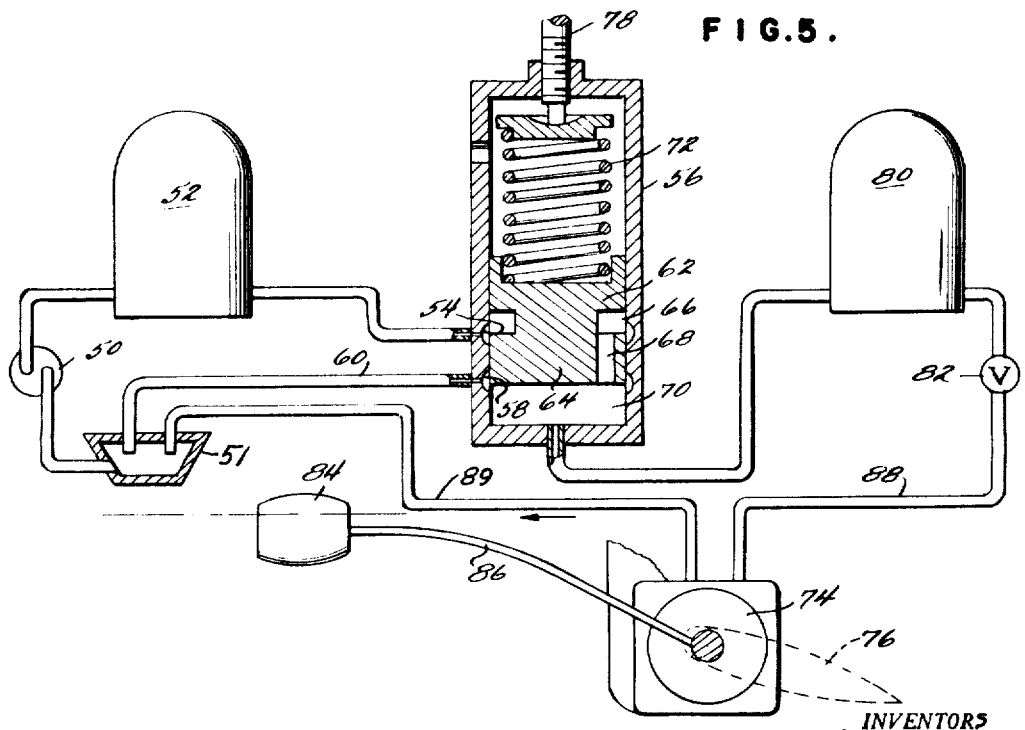
FIG. 5 is a schematic view, with parts broken away and parts shown in section, of a hydrofoil control system including a surface-sensing device and illustrating a modified form of mechanism for maintaining a constant lift.

FIGURE 5 of the drawings illustrates the principal parts of a complete system, incorporating a surface-sensing element and a modified form of constant force generating mechanism from that shown in FIGURE 4. In FIGURE 5, hydraulic fluid is supplied by pump 50 through a pressure reservoir 52 to a port 54 in a cylinder 56. This port 54 is shown connected to an annular groove in the cylinder wall spaced from a second annular groove 58 leading to an oil return line 60. A piston 62 has a lower portion 64 whose vertical height is such that, in the position shown, fluid entering port 54 is discharged into the annular piston space 66 and thence via a hole 68 to the lower cylinder portion 70 and thence to the return port 58. A coil spring 72 balances the pressure against the under-surface of the piston, and the balance condition is accurately maintained in that a slight downward movement of piston 62 will increase the area of port 54 and decrease the area of port 58, which slightly increases the pressure in chamber 70 and hence restores the equilibrium condition. Since the piston 62 will move only by a very small amount, the force exerted by the spring 72 is nearly constant even for a fairly short spring. The equilibrium of the piston then requires that the pressure in chamber 70, which acts on the hydraulic foil actuator 74, be nearly constant. Actuator 74 may be comprised of a fixed cylinder and movable piston such as shown in FIG. 4. The piston in this case would be directly connected to foil and pressure exerted from line 88 with urged movement of the piston in the direction of the foil. Sump line 89 connects the opposite end of the cylinder with sump 51. Actuator 74 controls the position of main foil 76, and hence the applied force is independent of the angle of attack of said foil. Changes in this constant force may be accomplished by vertical adjustment of the trim screw 78 which acts on the upper end of spring 72. Since hydraulic amplification takes place, in the system of FIGURE 5, the diameter of spring 72 may be quite small, even in the case of a large-size craft. This facilitates rapid adjustment of the trim, as required by certain maneuvers such as sharp turns. It may also be noted that the pressure operating on actuator 74 is independent of the oil supply pressure which may be permitted to vary between fairly wide limits. Pressure chambers of reservoirs 52 and 80 are provided, as shown, and contain some volume of air for acting as air cushions to reduce inertia effects in the hydraulic fluid. A regulating valve 82 between cushion 80 and actuator 74 permits adjustment of the damping of the system.

Figure 6:
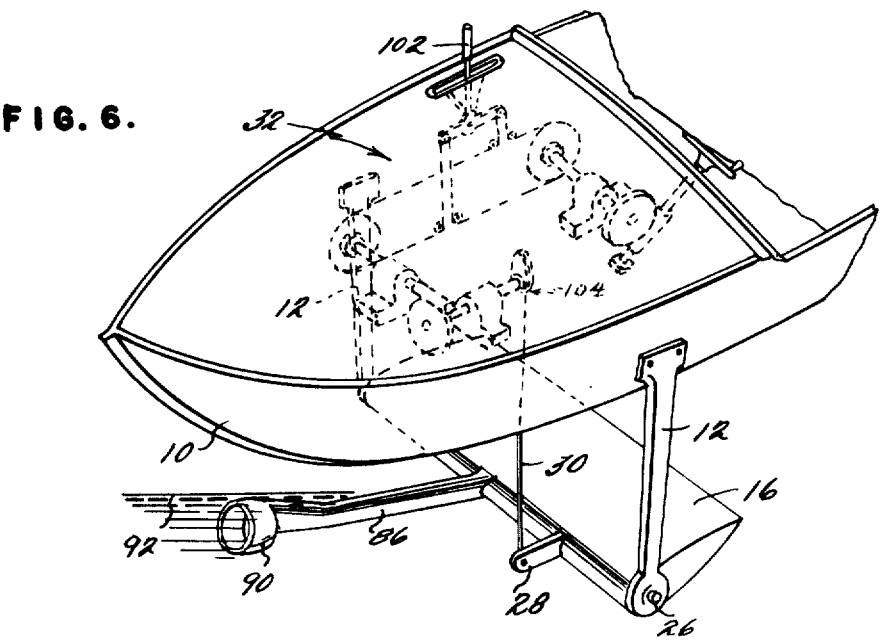
FIG. 6 is a view similar to FIG. 1 but illustrating the arrangement of a constant lift system with a particular form of depth-sensing element and the manual override control.

FIGURE 5 also shows a pilot foil 84, used as a surface-sensing device. The operation of such an element will be described in detail hereinafter, and for the present it will suffice to say that this pilot foil operates to "modulate" the constant force applied to foil 76 to maintain substantially constant submergence. To this end, foil 84 may be connected by its link 86 rigidly for movement with foil 76 or it may control a pilot valve modulating the force applied by actuator 74 under the influence of pressure fluid in its supply duct 88. The operation of the surface-sensing device will be more readily understood in connection with the simplified diagram of FIGURE 6 of the drawings, which again illustrates the hydrofoil craft having a hull 10 and struts and foils designated by the same numerals as in the case of FIGURE 1. For simplicity, the cable 30 is shown as connected to a mechanical constant tension system 32 secured to the hull, as in the case of FIGURE 1, but it is to be understood that the constant-force devices heretofore described may be employed in place of such a mechanical system, with consequent advantages as indicated above. In FIGURE 6, a lever 28 is shown as rigidly connected to the forward foil 16; a toroidal pilot foil 90 operating at or very near the water surface 92 being also connected by arm 86 to foil 16. Means providing a manual override control for varying the generated force is indicated by a lever 102 resiliently coupled to cable 30 as 104, in a manner similar to the arrangement of FIG. 1.

It will be recalled that the function of the surface-sensing device is to modulate the constant lift system in accordance with the degree of submergence, to the end that constant submergence may be attained. The surface-sensing device may itself be a foil carrying a portion of the craft's lift. The pilot foil may function as a surface broaching foil or as a foil that only approaches the surface. However, since at a submergence of one chord or more the lift does not vary appreciably with depth, the pilot foil will be most sensitive if it functions within the one-chord submergence level. Such a surface level measuring device and its follow-up control system must not be too sensitive to small changes in surface level, such as might be encountered due to incoming waves on a moderate sea, because it is undesirable to have the craft attempt to follow the wave surface. The control forces must be very small; the actual vertical accelerations would be a small fraction of 1 g. Larger disturbances, however, should cause the depth-sensing device to react with strong corrective control.

The toroidal foil shown in FIGURES 5 and 6 has the property of being relatively insensitive to small surface disturbance but is strongly affected by large disturbances, for two reasons. If such a foil is moving through the water with the water surface along its horizontal diameter and then the wing is slowly submerged, lifting surface is added at a progressively greater rate as the wing approaches complete submergence. When submergence is first started, there will be but little increase in lift, as the foil approaches complete submergence the lift force is rapidly increased at a high rate. Toroidal foil 90 meets the condition for relative insensitivity to small changes in surface level together with stronger corrective control for large changes. When such foil is rigidly connected for rotation with main foil 16 by lever 86, a very simple control system results. From FIGURE 6 it can be seen that if the hull raises too far above the water, foil 90 will also raise out of the water and lose its lift. The moment of the lift of the hydrofoil 16 then overbalances moments about the support fulcrum 26 and the connecting arms 28 and 86 move so as to decrease the angle of attack of both foils 16 and 90. Total lift of the system is decreased by this action and the hull is lowered, closer to the surface of the water, until the surface-sensing foil 90 is submerged enough to balance the moments about bearing 26. If the hull moves too close to the surface, the surface-sensing foil 90 submerges deeper, its lift increases and the opposite corrective action occurs. Since the submerged toroidal wing lift decreases rapidly as the foil 90 is raised close to the surface, it is feasible to use the toroidal foil submerged completely but close to the surface. It should also be noted that while the action described results from the effect of the change in lift of the sensing foil 90 as reflected upon the main foil 16, the actual vertical lift of foil 90 as a translational force acting through strut 12 is also significant, and is directed toward the same corrective action as that achieved by the servo portion of the arrangement. In other words, foil 90 operates as a source of lift in addition to its servo control function. The above combination of functional characteristics can also be obtained by other designs of surface-sensing foils.

Figure 7:
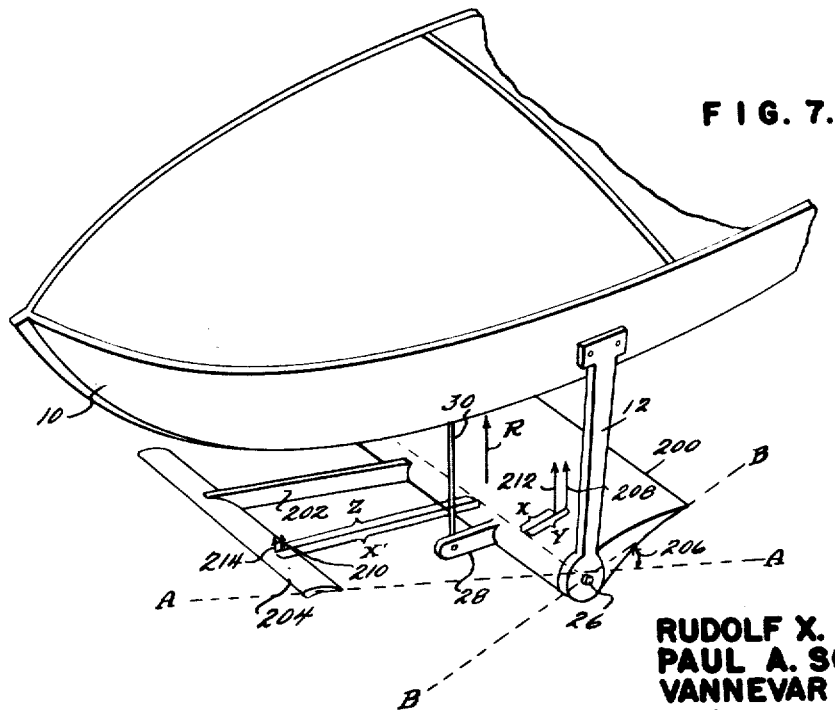
FIG. 7 is a fragmentary perspective view of a craft having a hydrofoil supported on struts and an auxiliary foil rigidly attached to the hydrofoil.

In FIGURE 7 a further modification is shown by way of a perspective partial view of a hydrofoil pivotally mounted on struts and which foil bears on auxiliary foil rigidly attached. It is to be understood that this configuration may be used in conjunction with a torsion bar or any other mechanism for producing or generating an adjustable force, as shown in FIGURE 1, and suitable equipment commonly used on hydrofoil craft. The hull 10 bears a pair of downwardly projecting vertical struts one of which is shown at 12. A hydrofoil 200 is pivotally mounted at the lower extremity of this strut by pivot 26. The cable 30 is attached to a torsion bar or other force generating device such as shown in FIGURES 1, 3, and 4. The lower end of cable 30 is attached to moment arm 28. Bar 202 is rigidly attached to foil 200 and projects forward from the leading edge thereof. Auxiliary foil 204 is rigidly mounted on the forward end of bar 202. The composite foil system, comprising foil 200, bar 202 and auxiliary foil 204, is free to rotate about the pivot line 26—26. Auxiliary foil 204 is so mounted on bar 202 that for any given angle of foil 200 relative to hull 10, auxiliary foil 204 will maintain a greater angle. This angular relationship is shown by dotted line B—B representing the chord line of foil 200 and line A—A representing the chord line of auxiliary foil 204. The angle of intersection 206 of these two chord lines, greatly exaggerated in the drawing for clarity, expresses this angular relationship. Foil 200 and auxiliary foil 204 are cambered types of foils in which the center of lift shifts aft with a decreasing angle of attack. It is understood however, that auxiliary foil 204 may be of the type in which the center of lift does not shift.

In operation, at a given speed which is sufficient to generate enough hydrodynamic lift or force by combined foil 200 and auxiliary foil 204 to support hull 10 above the surface of the water, equilibrium of the composite foil system is achieved when the moment of the resultant R, of the hydrodynamic lift of foil 200 at its center of lift, arrow 212 at a distance X from pivot line 26—26 and of the lift of auxiliary foil 204 at its center of lift, arrow 214 at distance X' from pivot line 26—26, equals the moment about pivot line 26—26 of the force applied through cable 30 to moment arm 28. If at a given speed the composite foil system enters a region of downwardly moving water particles, then the effective angle of attack of the foil system will be decreased. This will result in a rearward shift in the center of lift of each foil; for example, to the points of origin of arrows 208 and 210. At the same time the value of lift of each foil will decrease. By virtue of the greater angle of attack of auxiliary foil 204 relative to foil 200, the relative decrease will be disproportionately greater for foil 200 than for auxiliary foil 204. With a properly designed foil system the ratio of moment Z to moment Y will be equal to the ratio of moment X' to moment X. The resultant lift of the foil system will therefore decrease but the resultant center of lift will remain in the same place. The moment of the force applied by cable 30 will therefore overbalance that of the foil system, and the foil system will rotate in a clockwise direction thus increasing the angle of attack of the composite foil system. The centers of lift of foils 200 and 204 will shift forward to the points of origin of arrows 212 and 214 respectively and the value of the lift of resultant, R, will increase until its moment again equals the moment of cable 30.

The reverse action will occur when the foil system enters a region of upwardly moving water particles.

Now assume that the speed of the craft is increased, whether due to increase in propulsive force or to the orbital motion of water particles due to wave motion, then the lift of foil 200 at a given initial angle of attack will be increased by virtue of the increased velocity of water flow. The lift of auxiliary foil 204 will also be increased proportionately. The resultant, R, of the composite foil system therefore increases. The tension of cable 30 remaining constant, the foil system 200, 202, 204 will rotate in a counter-clockwise direction. As the composite foil system rotates the center of lift of foil 200 will move aft, for example, to a point designated by arrow 208. The center of lift of auxiliary foil 204 will also move aft to a point designated by arrow 210. Although the center of lift of foil 200 has moved aft to the point of origin of arrow 208, it will decrease in amount by virute of the decrease in angle of attack of said foil. The lift of auxiliary foil 204 will also decrease but, because of its relatively greater angle of attack, at a disproportionately lesser rate, the resutant, R, will not change its location but it will decrease in value. Equilibrium will again be reached when its moment again equals the moment of cable 30.

The opposite effect will occur if the speed of the craft is decreased.

Although the operation of this invention is described in a step by step fashion for greater clarity, in practice the rotation of the foil system is substantially instantaneous after subjection to a new condition, subject to the inertia of the system. Similarly a foil system such as that described can adjust itself continuously to simultaneous changes in velocity and angle of water flow relative to the foil system, so that the lift of the foil system regardless of changes in velocity and/or direction remain substantially constant at a value controlled by the tension of cable 30.

Figure 8:
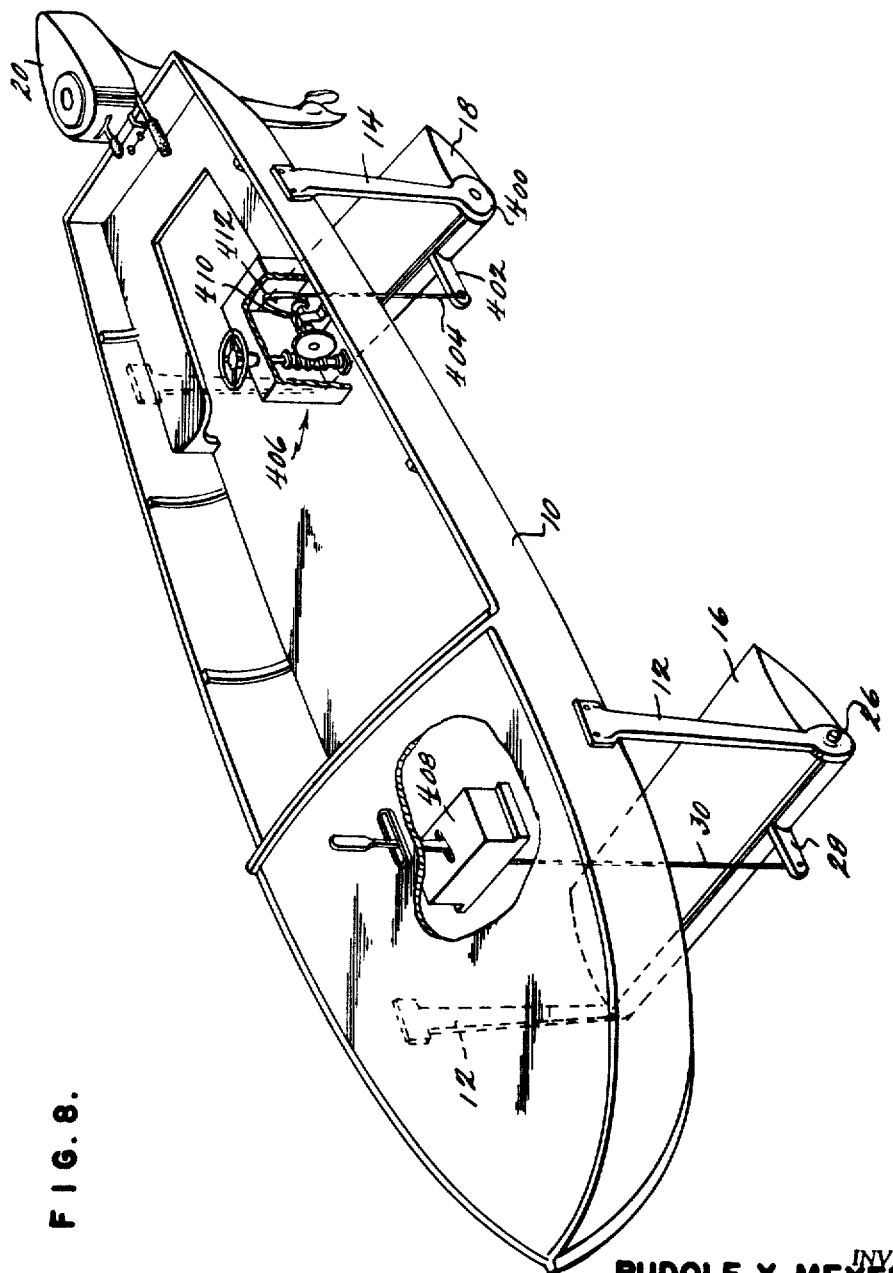
FIG. 8 is a view similar to FIG. 1 of a further application of the constant-lift principle, in this case applied to the rear foil of a craft.

Another modification of the constant lift principle is shown in FIGURE 8 of the drawings. In that figure, a hydrofoil craft is again shown including the hull 10 and a front hydrofoil system including the forward struts 12 and a main foil 16 carried thereby, and also rear struts 14 and a foil 18 carried thereby, this latter foil being pivoted as at 400 to struts 14. A lever arm 402 extends forward from foil 18 whose forward end is, for example, connected to the hull by a cable 404 including a cable tension mechanism 406 corresponding generally to the cable tension mechanism 32 of FIGURE 1. The front foil 16 is controlled as to position by any desired means, conventional or novel, indicated schematically by a control box 408. Thus, this schematic front foil control could be the type indicated in FIGURE 6, and may but need not necessarily include both constant lift and surface-sensing devices as already described.

The torsion bar and cam or equivalent force-producing element 410 of the rear foil in this case will not be of the precisely constant-force type (that is, independent of its displacement), but is so designed as to have a finite spring constant such that the generated force increases with a decrease in the angle of rear foil 18 relative to the craft. This deviation from constant force can be provided for in the design of the cam 412 in mechanism 406. In accordance with the principles of the invention, as already set forth herein, this preserves the basic advantage of the constant lift system, in that the effect of disturbing forces is limited to tolerable values. At the same time it makes unnecessary a separate depth-sensing device or other control means because depth control is provided by changes in angle of the craft relative to the horizontal. Thus if the bow should rise, the angle of attack of the rear foils would necessarily increase and therefore develop greater lift. The stern of the craft would then rise thus reducing the angle of the craft relative to the horizontal. The angle of attack of the rear foils would decrease and therefore the lift of said rear foils would decrease to a value sufficient to support the after portion of the craft. The reverse action would follow a lowering of the bow. With this type of modified constant lift, the rear foils tend to follow the mean path of the forward foil system. There thus is illustrated an application of the value of the constant-lift principle quite apart from a depth-sensing device, and also in which the exact achievement of constant force is departed from for a desired end.

The converse of the above modification of the constant lift principle has independent advantages. It involves a spring gradient opposite in sign to that referred to above in connection with FIGURE 8. This modification can best be described by reference to FIGURE 1 for the only difference from the above description of FIGURE 1 is that the force applied to cable 30 increases as cable 30 moves upward. This can be accomplished by designing cam 320 so that its effective radius decreases with the unwinding of torsion bar 322 faster than the force of torsion bar 322 decreases or it can be accomplished by any suitable mechanical amplification mechanism. With such modification, as foil 16 rotates in a clockwise direction to increase its angle relative to hull 10 the force transmitted by cable 30 to arm 28 increases.

Such an arrangement greatly simplified control, particularly when combined with the modification described above in connection with FIGURE 8 in a tandem foil system. Obviously such controls could also effectively apply to the use of the basic principle on flap control as in FIGURES 9, 14 and 15, the flap being a foil.

Assume that with such FIGURE 8 configuration the forward end of the craft should move downwards with the after end remaining at least temporarily at the same level. By virtue of this change in attitude of the craft, the angle of attack of the foils will be reduced. The lift of the forward foil will therefore be reduced and the moment of cable 30 force will overbalance the moment of the lift causing the foil to rotate to increase its angle of attack. As the foil rotates, the force moment will further increase calling for an angle of attack of the foil which will generate lift greater than that necessary to support the craft in level flight. The forward end of the craft will therefore rise. As it does so the angle of attack of the foil will increase as a result of the change in attitude of the hull. The lift generated by the foil will therefore exceed the generated force moment and the foil will rotate to decrease its angle of attack. As it does so the generated force in turn is reduced in value. With such foil rotation the lift will decrease as well, but it will decrease at a faster rate than the rate of decrease of the generated force. Equilibrium will therefore be restored at an attitude of the craft in which the moment of the lift generated by the foil equals the moment of the generated force applied to cable 30.

Figure 9:
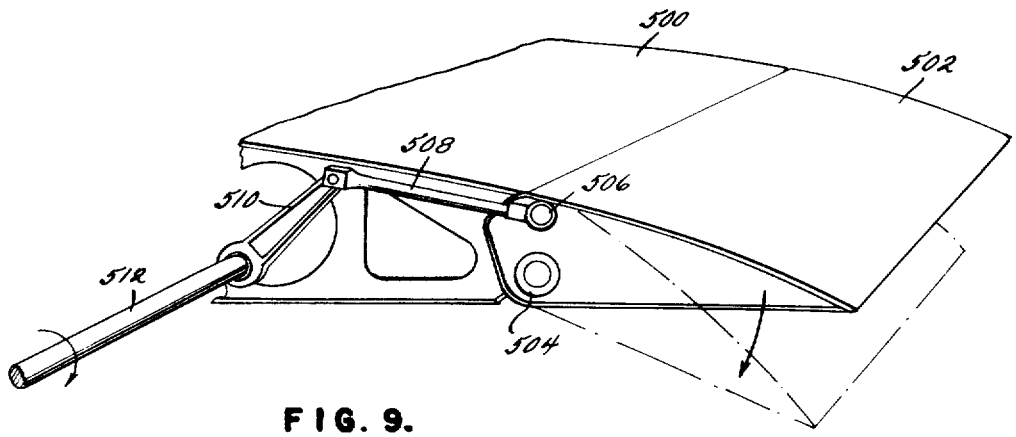
FIG. 9 is a perspective view, partly broken away, of the rear portion of a hydrofoil with a flap pivotally mounted thereon, which constitutes a modification of this invention.

FIGURE 9 is a perspective view, partly broken away, of an additional modification of a constant lift mechanism showing the rear portion of a foil with a flap pivotally mounted thereon. The foil 500 may be pivotally mounted on struts such as at 12 in FIGS. 1, 2 and 5 or it may be rigidly mounted on struts depending from hull 10 of a hydrofoil craft.

Referring to FIGS. 14 and 15, depicting this innovation, it will be noted that a flap 502 is pivoted at point 504 for rotation around a longitudinal axis. Also pivoted to foil 500 at point 506 is link 508. Link 508 is pivotally connected to crank 510 which crank is rigidly fixed to bar 512. Bar 512 may itself be a torsion bar, or it may be a non-resilient member rotatably mounted in bearings (not shown) for rotation by suitable sprockets, chains, gears and links driven by a spring or other force producing mechanism located in a hull 10 or a strut 12.

The following description of the operation of this mechanism assumes that bar 512 is a torsion bar which may be twisted by suitable links controlled within the hull as explained with reference to the other figures of the drawing.

In operation the bar 512 is preloaded to exert torque in a clockwise direction. Crank 510 is so mounted on bar 512 that it acts as a cam, whereby the moment of the torque is varied with rotation of the crank. Bar 512 in operation is loaded to the point at which it exerts a force on link 508, the moment of which about pivot 504 equals the hinge moment of flap 502 at any desired angle of attack of foil 500 to provide a desired lift at a given speed. When foil 500 enters a region of downwardly moving particles the angle of attack of foil 500 will in effect be decreased. The hinge moment of flap 502 will therefore also decrease and it will be overbalanced by the moment exerted through crank 510 and link 508. Flap 502 will therefore be deflected downward and thereby restore the same value of lift exerted by foil 500. The reverse action takes place in the event that the foil enters a region of upwardly moving particles.

Figure 10:
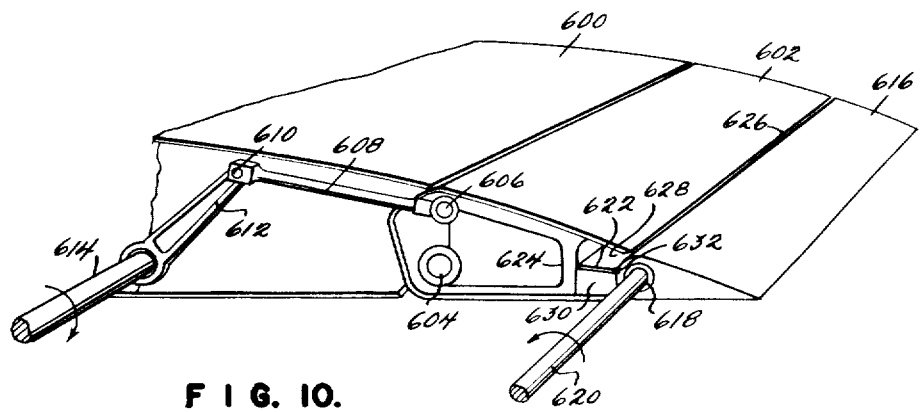
FIG. 10 is a perspective view, partly broken away, of the rear portion of a hydrofoil with a flap pivotally mounted thereon and additionally a tab pivotally mounted on the flap.

FIGURE 10 is a perspective view partly broken away of the rear portion of a hydrofoil 600 with a flap 602 pivotally mounted thereon on a longitudinal axis 604 and connected by pivot 606, link 608, pivot 610 and crank 612 to bar 614 which may itself be a torsion bar or be rotated by some other force producing device.

On the rearward portion of flap 602 there is mounted a tab 616 which is pivoted on a longitudinal axis 618. Bar 620, which may itself be a torsion bar or may be connected to a torsion bar by suitable links, is rigidly attached to tab 616 at least one point. Projecting from the leading edge of tab 616 is plate 622, the leading edge of which plate is in close proximity to arcuate member 624. The surface of tab 616 is separated from the surface of flap 602 by slots 626.

In operation, the chamber 628, formed by plate 622, arcuate member 624, the upper rearward inner side of flap 602, and the leading edge of tab 616, remains at a pressure equal to the pressure on the surface of flap 602 and tab 616 at slot 626. Similarly, chamber 630 which is the counter part of chamber 628 remains at the same pressure as the bottom surface of flap 602 and tab 616 at slot 626. The effective center of lift of tab 616 is located forward of pivot 618, at a position represented by point 632.

Consider first the craft flying in smooth water, preloaded torsion bar 614, in cooperation with preloaded torsion bar 620 will establish angular relationships among foil 600, flap 602 and tab 616 to provide a predetermined value of lift at a given speed. As the craft increases its speed, the lift of flap 602 will increase. Simultaneously the lift of tab 616 will increase. Since tab 616 is pivoted aft to its effective center of lift, this increase in lift will overbalance the torque exerted by torsion bar 620 and tend to rotate tab 616 in a clockwise direction. This rotation will further increase the lift of tab 616 and cooperate with the lift of flap 602 to overbalance the clockwise moment exerted by torsion bar 614 about pivot 604. Flap 602, bearing tab 616 with it, will therefore rotate in a counter-clockwise direction thus reducing the lift of the combined flap 602 and tab 616 until equilibrium is again reached at the original value of lift. Now suppose that foil 600 enters a wave, and is subjected to an upwash, then the lift of flap 602 and tab 616 will increase by virtue of the increased angle of attack imposed upon them. Tab 616 will further rotate in a clockwise direction, and flap 602 will further rotate in a counter-clockwise direction, until a new equilibrium is established in which the moment of the lift of the flap and tab again balances the moment of the torque exerted by torsion bar 614 about pivot 604.

The opposite actions will take place in response to a decrease in speed of the craft and for entry of the foil into a downwash. In addition, where a downwash coincides with an increase in speed, the motion of the flap and tab will be the resultant of the difference of forces involved. In view of the size of the elements involved very little inertia will be present so that flap 602 and tab 616 are free to oscillate in response to different velocities and angles of incidence of water flow substantially instantaneously, thereby maintaining a substantially constant value of lift for the foil 600, flap 602 and tab 616 as a whole.

Figure 11:
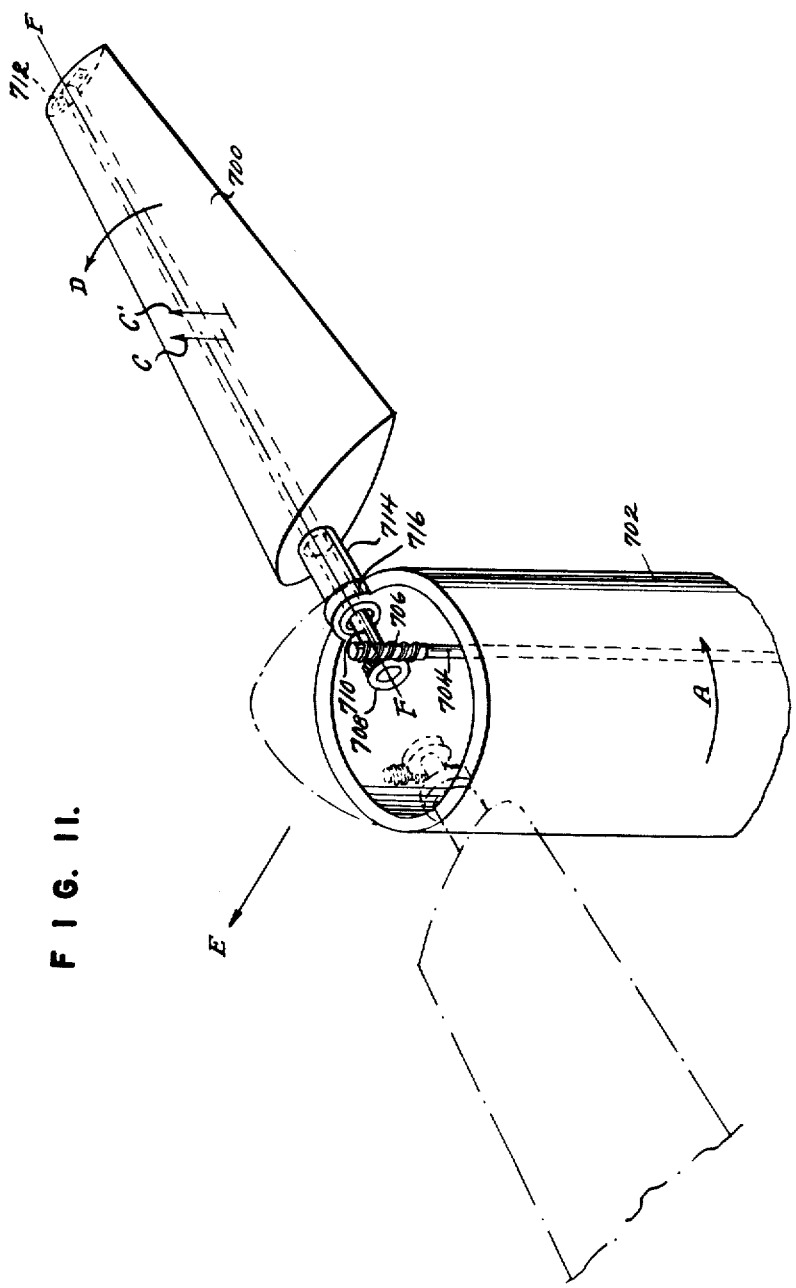
FIG. 11 is an isometric view of a partial helicopter construction showing the application of the constant lift principle to helicopter blades.

FIGURE 11 shows, in isometric projection partly broken away, an application of the constant lift principle to helicopter blades. In order to simplify the description of this application only one full blade 700 is shown. It is to be understood that a functioning helicopter requires at least two blades and that such other blades with their associated control mechanisms are in all respects identical to blade 700. One other such blade is diagrammatically shown in dotted lines in the drawing.

In the illustrated embodiment of the application of the constant lift principle to helicopter blades, a main shaft 702 transmits the motive power to rotate the blades in order to achieve flight. Vertical shaft 704 is mounted within main shaft 702 for rotation on its own axis by a motor or other mechanism also within main shaft 702 and controlled by the pilot. Vertical shaft 704 and its motor rotate in a direction indicated by arrow A as integral parts of main shaft 702. The upper end of shaft 704 carries a worm 706 which meshes with worm gear 708. Worm gear 708 is mounted on the inner end of torsion bar 710, which extends through the blade 700 substantially its entire length, and is rigidly attached to blade 700 at its outer end 712. Torsion bar 710 passes through the center of shaft 714 on which blade 700 is mounted. Shaft 714 in turn is mounted on main shaft 702 in bearing 716. The inside of shaft 714 constitutes a bearing for torsion bar 710. In view of the length of torsion bar 710, it is in effect a very long spring. As is well known, very long springs can be designed to have a substantially zero gradient, or they can be designed to provide a positive gradient such that when placed under stress their resistance to further displacement increases with such displacement, and such resistance decreases as the displacement is reduced. In the preferred embodiment, shaft 714 is so mounted with respect to blade 700 that its axis, i.e., the axis of spanwise rotation of blade 700, indicated by line F—F, lies between the aerodynamic center and the leading edge of said blade.

Arrows A and D represent the direction of rotation respectively of main shaft 702 and blade 700 for flight. Arrow E represents the direction of flight of the helicopter.

In order to take off, shaft 704 is rotated in a clockwise direction which in turn, acting through worm 706 and worm gear 708, rotates torsion bar 710 in a clockwise direction. Rotation of torsion bar 710 urges blade 700 to rotate in a clockwise direction to increase its angle of attack.

Main shaft 702 may be set in rotation before or after imparting twist to torsion bar 710. For any given speed of rotation of main shaft 702 and blade 700, when the latter is at a positive angle of attack, said blade will generate lift by virtue of the air flow over its surface. The moment of this lift acts in opposition to the moment of the torque of torsion bar 710 about axis F—F. Blade 700 will therefore remain at an angle of attack at which the moment of the lift is equal to the torque moment of torsion bar 710. Thus the amount of lift generated by blade 700 is controlled by the amount of rotation of torsion bar 710. Increasing such rotation, at a predetermined speed of rotation of main shaft 702 and blade 700, will increase the angle of attack of blade 700 and therefore increase the lift of said blade and the craft will rise. Rotation of torsion bar 710 in the reverse direction will allow the angle of attack of blade 700 to decrease and the helicopter will descend.

Now, as is well known, the lift of an airfoil such as a helicopter blade is dependent primarily upon the mean effect velocity of air flow over such blade and the angle of incidence of such flow to such blade. In the case of a helicopter moving in the direction of arrow E, the mean velocity of air flow over blade 700 when said blade is also moving in direction E will be greater and, due to the necessary inclination of the plane of rotation of the blades to the horizontal, the angle of incidence of such flow, if the blades maintained a fixed angle relative to main shaft 702, would be less than that over the other blades. In order to maintain level flight, it is necessary continuously to vary the angle of attack of each separate blade. Thus as each blade moves in the direction of flight of the helicopter its angle of attack must be at a particular value. As this blade rotates forward to a position at which its direction of motion is at right angles to the line of flight, its angle of attack must be increased, and as it moves in the opposite direction to that of the line of flight, its angle must be further increased.

The embodiment of the application of constant lift to a helicopter blade shown in FIGURE 11 utilizes a cambered blade. As is well known, as the angle of attack of such blade decreases, its center of lift shifts towards the trailing edge of the blade. Assume that the helicopter has risen vertically and the pilot desires to move in direction E. The center of lift while the craft is not moving forward is at a point represented by arrow C. As the helicopter moves forward, the speed of rotation of blade 700 is augmented by the forward speed of the helicopter. The lift of blade 700 will therefore increase, and the moment of such lift will overbalance the moment of the torque of torsion bar 710 causing blade 700 to rotate about axis F—F to decrease its angle of attack. As this rotation takes place, the center of lift will shift towards the trailing edge to a point represented by arrow $C^I$. The moment of the lift therefore again increases but, since torsion bar 710 is designed with a particular positive gradient such that the torque moment increases in proportion to the increase in the lift moment, the total value of the lift of blade 700 remains approximately constant.

As the blade 700 rotates about the vertical axis of main shaft 702, the rate and angle of incidence of air flow decrease relative to said blade, thus reducing the lift of blade 700. The torque moment of torsion bar 710 therefore overbalances the lift moment and rotates blade 700 on axis F—F to increase its angle of attack, thus tending to restore the value of said lift. The forward shift in center of lift is compensated for by the decrease in the torque moment due to rotation of the outer end of torsion bar 710.

The mode of operation of this embodiment of the invention has been described in a step-by-step manner for the sake of clarity. It is understood however that the rotation of each blade on its spanwise axis is continuous, as is the twisting and untwisting of each associated torsion bar, so that the lift of each blade remains at all times substantially constant. The present invention therefore simultaneously compensates for differences in direction of air flow with respect to the blades resulting from gusts and air pockets, as well as from the inclination of the plane of rotation.

Torsion bar 710 may be placed in either position within blade 700 or elsewhere and the shift in center of lift with change in angle of attack can be compensated for by suitable cams and mechanical or hydraulic links. The axis of spanwise rotation can be arranged at other points in blade 700. Automatic means may readily be provided to vary the moment of the generated force in accordance with the position of each blade in its orbit, to facilitate horizontal travel in any direction. Moreover, other means may be used for generating a predetermined force to act about a pivot on a spanwise axis of blade 700 in opposition to the lift of said blade, such as the hydraulic or pneumatic force producing mechanisms illustrated in FIGS. 3 and 4.

It is further pointed out that a substantially identical structure of a torsion bar and its associated control mechanism is suitable for application to aircraft or marine propellers, and such application can readily be made by anyone skilled in the art. As has been indicated above, the embodiment of the constant lift principle illustrated in FIGURE 11 compensates both for variation in speed of fluid flow and variations in load. In the case of marine and air propellers, variations in speed of fluid flow relative to the blades of such propellers is of less consequence than in the case of helicopter, but the principle and mode of operation are identical.

In FIGURES 12 and 12a, a modified type of pivot for attaching a hydrofoil to a strut is shown. The strut 800 is provided with a fore and aft extending slot 802 in its lower end. The foil 804 has upright pivot member 806 secured thereto and which has a cam-shaped bearing surface 808. The base of slot 802 is also formed as a cam-shaped bearing surface 810 for coaction with surface 808.

One end of a flexible metallic strap 812 is secured to surface 810 and has its other end secured to surface 808. A pair of flanking straps 814 and 816 are also secured between the strut and the foil. However the ends of strap 812 and straps 814, 816 which are connected to the foil lie at opposite ends of the set of straps, so that as the foil tilts or changes its angle of attack, one strap curves and the others straighten out, and vice versa.

The surfaces 808 and 810 constitute, in conjunction with straps 812, 814 and 816, a travelling or rolling pivot for the foil with respect to the strut. The curved strap surfaces roll upon the surfaces 808 and 810, which may thus be shaped to provide a cam type of operation and thereby the "shifting" pivot point can compensate for a spring gradient in a constant lift system or compensate for the variation of the aerodynamic center with change in angle of attack of cambered foils. In addition, the use of this type of pivot eliminates under-water sliding surfaces and bearings. The foil 804 may be connected by cable 30 to a force generating mechanism as described in connection with various other figures in this application.

While the application of the principle of constant lift has been disclosed herein in connection with certain preferred embodiments of hydrofoil craft, it is to be understood that the mechanical details of the various forms of the invention have been given by way of illustration and example, and that the principles of the invention can be incorporated in various different arrangements without departing from the spirit and scope of the invention as defined in the appended claims.

Manifestly, minor changes in details of construction will appear to those skilled in the art to which the present invention pertains and which will not depart from the spirit and scope of the present invention as defined in the appended claims. As an example of such changes as fall within the scope of this invention, reference is made to the positive and negative gradient principles as applied to a FIGURE 8 concept.

We claim:
1. A hydrofoil supported craft comprising at least one flotation element, at least one strut depending therefrom, at least one hydrofoil of total submergence design pivotally mounted on said strut, balancing means comprising at least one spring having first and second ends, said first end adjustably fixed to said craft, a monoaxial cam fixed to said second end, flexible means interconnecting the surface of said cam with said hydrofoil, thereby continuously applying an adjustable constant torque to said hydrofoil, said constant torque operating about the pivot in opposition to the lift of said foil, the moment of said force remaining equal to the moment of said lift, the lift of said hydrofoil being substantially constant in water flow which is variable relative to said hydrofoil.

2. A hydrofoil supported craft comprising a flotation element, at least one strut depending therefrom, at least one hydrofoil of total submergence design mounted on said strut, negative gradient torque generating means comprising at least one spring having first and second ends, said first end being fixed and said second end mounting a monoaxial cam, and a cable interconnecting said cam and said hydrofoil; said means being adapted to balance the lift of the hydrofoil.

3. A constant lift craft adapted to fly upon at least one submerged foil which is responsive to a given command moment, comprising: a hull; at least one foil in pivotal interconnection with said hull, a foil command moment system of constant lift including: adjustable uniform force producing means mounted on said craft; force applying means mounted on said foil, applying the force produced by said force producing means as a uniform moment tending to increase the angle of attack of said foil and thereby commanding a selected constant lift; and at least one flexible coupling operatively interconnecting said force producing means and said force applying means.

4. A craft as claimed in claim 3, in which said force producing means includes a cylinder mounted upon said craft, one end of which is open to a first source of pressure and the other end of which communicates with a second controlled source of pressure.

5. A craft as claimed in claim 3, in which said force producing means includes a source of pressure fluid, a cylinder, a piston in said cylinder having a port and conduit connecting a side of the piston with one end of said cylinder, an adjustable compression spring in the other end of said cylinder bearing upon said piston, a conduit connecting said source of pressure fluid with a first port in the wall of said cylinder, a second port in said cylinder wall spaced from said first port and communicating with a fluid return line, and a substantially constant pressure conduit connecting the fluid pressure side of said cylinder through said flexible coupling to said force applying means.

6. A constant lift, hydrofoil craft comprising a flotation member, at least one supporting strut depending therefrom, a hydrofoil of total submergence design pivotally supported by said strut for varying angles of attack, vacuum cylinder and piston means engaged with the hydrofoil to exert a normally constant torque upon said hydrofoil in opposition to its lift, and a depth sensing auxiliary foil of toroidal design rigidly connected to the hydrofoil forward of its pivot and adapted to lie submerged but adjacent to the water surface during flight, perturbing thereby the constant torque in accordance with variation in lift of said auxiliary foil.

References Cited in the file of this patent

UNITED STATES PATENTS

| | | |
|---|---|---|
| 1,040,608 | Baker | Oct. 8, 1912 |
| 1,083,464 | Roche | Jan. 6, 1914 |
| 1,227,784 | Hewitt | May 29, 1917 |
| 1,618,036 | Wilson et al. | Feb. 15, 1927 |
| 1,876,634 | Desautels | Sept. 13, 1932 |
| 1,967,461 | Ballew | July 24, 1934 |
| 2,387,907 | Hook | Oct. 30, 1945 |
| 2,395,862 | Freeman et al. | Mar. 5, 1946 |
| 2,443,393 | Landgraf | June 15, 1948 |
| 2,576,716 | Gardiner | Nov. 27, 1951 |
| 2,584,663 | Bensen | Feb. 5, 1952 |
| 2,603,179 | Gardiner | July 15, 1952 |
| 2,623,717 | Price | Dec. 30, 1952 |
| 2,627,928 | Mullgardt | Feb. 10, 1953 |
| 2,692,650 | Pullin et al. | Oct. 26, 1954 |
| 2,703,063 | Gilruth | Mar. 1, 1955 |
| 2,708,894 | Hook | May 24, 1955 |
| 2,720,272 | Prince | Oct. 11, 1955 |
| 2,722,189 | Hobday | Nov. 1, 1955 |
| 2,757,745 | Verhage et al. | Aug. 7, 1956 |
| 2,771,051 | Schertel | Nov. 20, 1956 |
| 2,773,467 | Bailey | Dec. 11, 1956 |
| 2,890,671 | Hobday | June 16, 1959 |

FOREIGN PATENTS

| | | |
|---|---|---|
| 752,142 | France | July 10, 1933 |
| 404,964 | Great Britain | Jan. 22, 1934 |
| 493,176 | Great Britain | Oct. 4, 1936 |
| 458,111 | Great Britain | Dec. 14, 1936 |
| 516,651 | Great Britain | Jan. 8, 1940 |
| 588,112 | Great Britain | May 14, 1947 |
| 588,733 | Great Britain | June 2, 1947 |